United States Patent

[11] 3,586,032

| [72] | Inventor | Richard Weinstein |
| | | Huntington, N.Y. |
| [21] | Appl. No. | 813,050 |
| [22] | Filed | Apr. 3, 1969 |
| [45] | Patented | June 22, 1971 |
| [73] | Assignee | Flair Manufacturing Corporation |

[54] FLOAT VENT APPARATUS
5 Claims, 4 Drawing Figs.

[52] U.S. Cl. ............................................. 137/202,
 137/448
[51] Int. Cl. ............................................. F16k 45/02
[50] Field of Search ............................................. 137/202,
 185, 448

[56] References Cited
UNITED STATES PATENTS

| 1,838,089 | 12/1931 | Baker | 137/185 |
| 2,276,136 | 3/1942 | Woolley | 137/202 |
| 2,790,456 | 4/1957 | Shaw | 137/185 X |
| 3,334,645 | 8/1967 | Weinstein | 137/202 |

FOREIGN PATENTS

| 8,218 | 4/1910 | Great Britain | 137/202 |

Primary Examiner—Alan Cohan
Attorney—Burgess, Dinklage and Sprung

ABSTRACT: An improved venting device used for removing air and other gases from closed liquid systems, and particularly to a venting apparatus having a gas vent valve which is automatically operated by a float controlled junction member arrangement.

PATENTED JUN22 1971
3,586,032
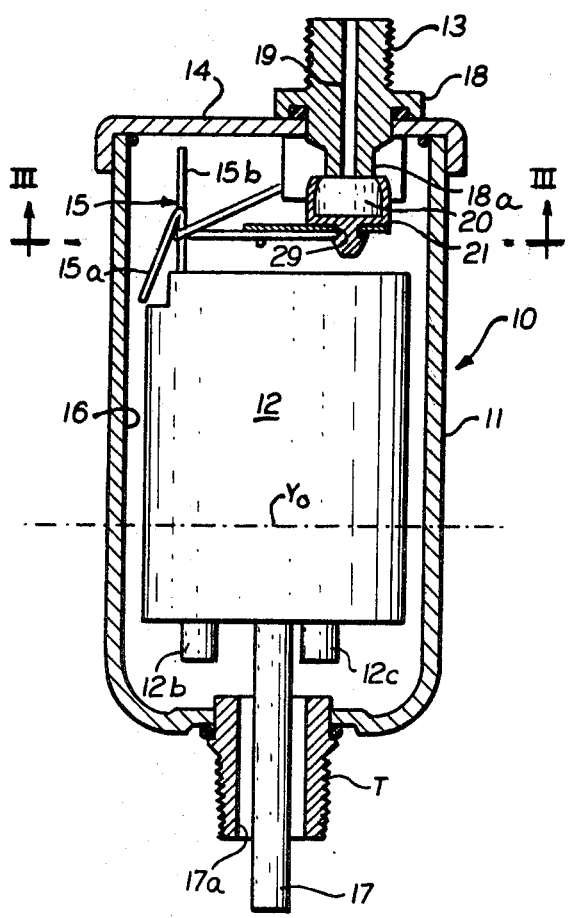
FIG. 1.
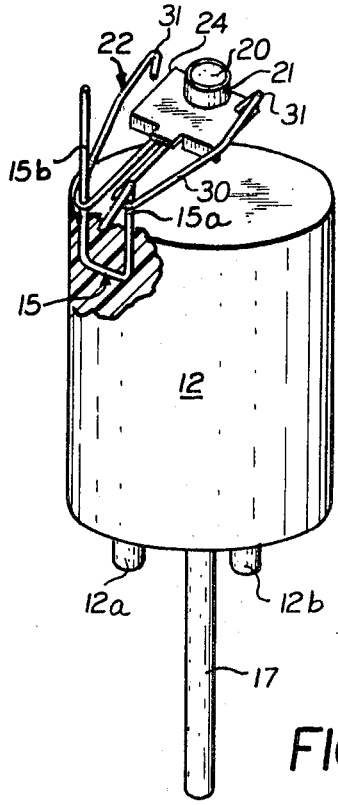
FIG. 2.
FIG. 3.
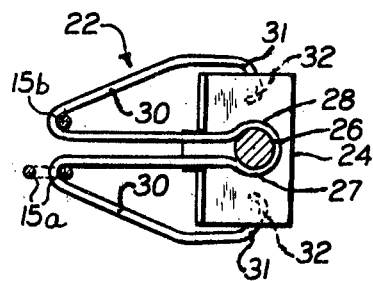
FIG. 2a.
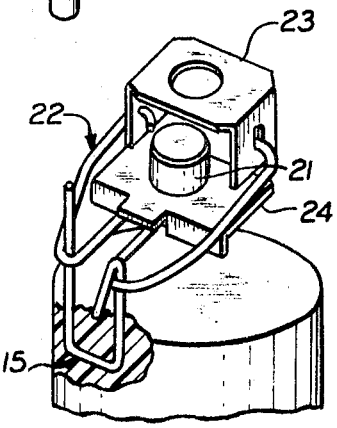
INVENTOR
RICHARD WEINSTEIN
BY
*Burgess, Dinklage & Sprung*
ATTORNEYS.

FLOAT VENT APPARATUS

BACKGROUND OF THE INVENTION

The working parts of venting apparatus of closed liquid systems are substantially enclosed by a float chamber which is flow connected to the liquid system to be vented. A normally closed valve fixedly mounted to the upper portion of the float chamber extends partially into the interior of the float chamber and provides for venting gases from within the chamber out to the ambient atmosphere, the venting occurring when the valve is opened.

A lever is disposed within the float chamber and is operatively connected to the valve to provide for opening the valve to vent the chamber when the liquid within the chamber falls below a predetermined level. This is accomplished by providing a lever with means, which engages a free float member. The float member is also disposed within the chamber between the wall and the lever and is free to rise and fall with the level of the liquid in which it floats. The lever and the external connection of the float member to the lever are so constructed that when the liquid in the chamber is below the predetermined level selected for venting, the float member is slidably engaged by the lever and float chamber, as well as during the support by the buoyant forces of the liquid. The float member weight which is not supported by the liquid acts against the lever thereby causing it to open the valve.

When the chamber is vented, the liquid level therein rises until the buoyancy of the float member relieves of weight engagement with the lever thereby causing the valve to be restored to its normally closed position. A spring clip acts to urge a rubber pad, which is mounted on a button member, against the tubular seat portion of the valve body that extends into the float chamber, thereby providing a normally closed valve. In this manner, the venting apparatus of the instant invention is automatically operated.

As the float member descends with the descending liquid level in the chamber, it slides along the lever and in addition, gradually pushes the lever in a direction which opposes the force of the spring clip, thereby lifting one side of the pad away from the valve seat to open the valve.

SUMMARY OF THE INVENTION

The improvement advantages provided by the venting apparatus of the invention are its free float member and fixedly attached junction-member engagedly connecting with the fastening arrangement of the spring clip and bracket, button and valve.

The common problem of jamming which occurs in many prior art venting devices has been eliminated by using a free float member with positive slidable mechanical connection or attachment to another part. In addition, the labor and time required to assemble the venting apparatus of the invention is considerably less that that required for many prior art venting devices due to the elimination of complex linkages and the use of snapin fastenings. Thus, the venting apparatus of the instant invention can be simply assembled without any special tools or skill.

Under normal operating conditions, only one side of the pad will be lifted from the seat when the valve is opened, with the opposite portion of the seat edge pivotably connected to said pad and serving as a fulcrum for the junction member and button movement. If desired, the spring clip, junction member, float member and button can be constructed in accordance with the invention so that the pad is lifted completely away from the seat.

Additionally, the float has extensions protruding from the bottom thereof which prevent the float from closing the bottom part when the chamber is draining.

It is therefore an object of the invention to provide an improvement in an apparatus which can automatically vent gases from a liquid system.

BRIEF DESCRIPTION OF THE DRAWING

Other objects and advantages of the venting apparatus according to the invention will appear in the following detailed description and accompanying drawings in which:

FIG. 1 is a side elevation view, partly in section, of a venting apparatus according to a preferred embodiment of the invention;

FIGS. 2 and 2a are views, partly in section of the apparatus of FIG. 1, and,

FIG. 3 is a top view of the spring assembly.

DESCRIPTION OF THE PREFERRED EMBODIMENT

Referring now to FIGS. 1 and 2, venting apparatus 10 is provided with chamber 11 for receiving liquid and separable gases from a liquid source (not shown) having such separable gases in admixture with a liquid and for containing such gases as separate from the liquid in free surface equilibrium with the liquid in chamber 11.

Float member 12 is disposed for limited movement within chamber 11 guided along a predetermined path corresponding to the movement of the free surface of the liquid which normally will be a vertical path. Float member 12 is disposed for buoyant engagement with the liquid and is positioned thereby relative to chamber 11 along said path in corresponding relation to the position of the free liquid surface therein. Float 12 has three cylindrical extensions 12a, 12b, and 12c projecting from the bottom which prevent float 12 from closing bottom part 17a when the liquid in chamber 11 is draining out and back to a liquid source (not shown). This eliminates the possibility of creating a vacuum in chamber 11.

Valve 13 which serves for venting separated gases from chamber 11 is disposed in communication with the interior of chamber 11, preferably at upper portion 14 thereof where the separated gases will collect. The exact location of valve 13 on upper portion 14 of chamber 11 is not critical so long as valve 13 does not come into communication directly with the liquid as its free surface rises during the venting of gases from chamber 11. For this purpose, and for expediency in manufacture and in operation, valve 13 is preferably located at the point of uppermost elevation on upper portion 14.

Valve 13 is biased to be normally closed and is operatively connected to junction member 15, which is fixedly attached to float member 12, to open where the float is below a selected position $Y_o$ along the path of float member 12 movement.

Chamber 11 is connected to the liquid source (not shown) by any suitable conventional means, such as a threaded fitting T. As contemplated by the invention, such connection to the liquid source is made so that the liquid within chamber 11 has a sufficient hydrostatic pressure such that when valve 13 has been opened, the free surface of the liquid within chamber 11 will rise to a level which buoys float member 12 upwardly, relieving the hooked engagement between spring clip 22 and junction member bent portion 15a in order to restore valve 13 to its normally closed state. The hydrostatic pressure is also essential to expel the separated gases within chamber 11 when valve 13 is open.

Venting apparatus 10 provides for automatically venting gases separated from the liquid and collected in chamber 11 whenever such separated gases from the liquid source (not shown) accumulate to such an extent within chamber 11 that the free surface of the liquid therein is depressed to below the point $Y_o$. Float member 12 is then positioned at or below the point $Y_o$, and thereby engages spring clip 22 with junction member bent portion 15a opening valve 13 and expelling the gases therethrough by the hydrostatic pressure exerted by the rising liquid until float member 12 is freely supported by the liquid, which occurs when the free liquid surface rises a corresponding distance above the point $Y_o$, whereby float member 12 rises and valve 13 being biases normally closed, prevents the liquid from escaping.

The advantageous improvement afforded by the invention is that float member 12 is slidably attached to spring clip 22 by junction member 15 in order to effect the automatic venting action. Junction member 15 is disposed so as to laterally constrain any rotational movement of float member 12 in order to prevent float member 12 from assuming a lateral position relative to junction member 15 where it will be ineffective to actuate spring clip 22 in response to changes in the free surface liquid level in chamber 11. Such an arrangement of spring clip 22 and float member 12 requires no physical connection therebetween, but will perform the intended function merely by abutting contact engagement between spring clip 22 and junction member 15, which is fixedly attached to float member 12.

Guide bar 17 extends from the bottom of and axially common to the axis of float 12, through the bottom of chamber 11 and into part 17a. Float 12 is free to float on the liquid surface and is maintained centrally located during movement upwardly and downwardly by the buoyant forces of the liquid with guide bar 17 and junction member 15. This permits a large diameter of float 12 to be utilized resulting in greater volume displacement wherein float 12 is guidably floated only in an upward and downward direction and constrained in the lateral direction. Minimizing or preventing contact between float 12 and chamber 11 prevents the possibility of inoperation or reducing the efficiency of operation due to surface friction with internal wall 16. The reduced contact by retaining float 12 centrally guidably positioned also prevents drag caused by the interference of oils, slimes and other sticky impurities of the system collecting on wall 16 and the external surface of float 12 with movement relative therebetween and therefore affords a maximum of freedom of movement.

As is shown in FIGS. 1 and 2, junction member 15 has a bent first portion 15a disposed for operative engagement with spring clip 22, when float member 12 is at the position $Y_o$, to partially open valve 13. A second portion 15b, which is straight and is contiguously adjoining said bent first portion 15a, is disposed for operative engagement with spring clip 22 when float member 12 is at positions above $Y_o$ to prevent float member 12 from rising too high, in addition to preventing the float from being twisted or rotated whereby bent portion 15a could jam in spring clip 22. Both portions 15a and 15b are disposed in cooperating relation to guide 17 and with respect to wall 16 of chamber 11 so as to constrain the lateral movement of float member 12 within a predetermined region bounded laterally by guide bar 17, junction member 15, and wall 16, and yet permitting float member 12 free vertical movement with the free liquid surface. In addition, bent portion 15a, which is inclined preferably at an angle of approximately 120° over to within about 30° of itself with respect to straight portion 15b, in addition to extensions 12a, 12b, and 12c, prevents float member 12 from slipping downward between the lower portions of wall 16 to the extent where it becomes jammed therebetween so as to render it ineffective for automatic venting purposes.

It has been found satisfactory for cylindrical float member 12 illustrated in FIGS. 1 and 2, to construct junction member 15 so that its first bent portion 15a is preferably inclined at an angle of approximately 30° with respect to the straight portion 15b (and the lateral surface of the cylindrical float member 12), so as to provide an optimum leverage to enable float member 12 to overcome the bias of spring clip 22 and inertia of valve 13 in initially displacing valve 13 from its normally closed position to a partially opened condition. Second portion 15b of junction member 15 is preferably without any inclination with respect to the extension of first portion 15a. Float member 12 will be prevented from twisting, rotating or rising too high by portion 15b and thereby prohibit jamming of junction member 15 where bent portion 15a could be prevented from freely disengaging from spring clip 22.

As the separated gases escape from chamber 11 and the liquid level therein rises, junction member 15 slidably disengages from the spring clip 22 and will allow float member 12 to rise with the liquid. In this manner, junction member 15 is operatively connected and disconnected to valve 13 which is generally spring-biased into the normally closed position, that being the direction opposite to the movement of float member 12 when float 12 effects opening of valve 13.

Valve 13 includes valve body 18 having a tubular edged seat member 18a disposed for communication with the interior of chamber 11 and defining venting passage 19 extending through valve body 18, and resilient closure member 20 which is supported in buttonlike holding member 21, and is disposed in operative engagement with the sharp edge of the tubular seat member 18a. Closure member 20 is preferably made in the form of a suitable resilient pad so as to be capable of suitable deformation without cutting when normally pressed into engagement with the sharp edge of seat member 18a by spring clip 22 to maintain valve 13 in a normally closed state. Closure member 20 normally executes a pivoting movement in relation to seat member 18a, when it is moved by junction member 15 against the influence of spring 22, connected between bracket 23 and buttonlike holding member 21, to open valve 13 and when it is moved by spring 22 to close valve 13, with a portion of the edge of seat member 18a serving as a fulcrum for such pivoting movement in both cases. Depending upon the elastic constant of spring 22, and the effective force exerted through junction member 15 by float member 12, closure member 20 may also execute a combined translation and pivotal rotation with respect to seat member 18a when valve 13 is opened.

As can be more clearly seen by FIG. 3, together with FIGS. 1 and 2, resilient closure member 20 is supported in holding member 21 having a grooved projecting member 26 disposed through an aperture 27 in platform 24, upon which holding member 21 rests. Spring clip 22, is a generally flat planar-biased, W-shaped, bifurcated spring clip, providing bias in similar fashion as the well known paper clip, having a centrally disposed arcuate retainer portion 28 disposed in operative engagement with groove 29 on projecting member 26, so as to fasten holding member 21 and simultaneously provide an operative connection between spring clip 22 and closure member 20. Legs 30 of spring clip 22 are disposed inwardly as at 31 to engage into holes 32 provided in bracket 23 affixed to upper portion 14 of chamber 11. Bracket 23 is fixedly attached to valve body 18 directly with one end of spring clip 22 operatively connected above the valve seat 18a of valve 13, this operative connection generally directly above thereto, to provide the necessary bias force so that the intended result of maintaining normally closed valve 13 is achieved.

While there has been described what is at present considered to be preferred embodiments of this invention, it will be obvious to those skilled in the art that various changes and modifications may be made therein without departing from the invention. It is to be understood that the above-described arrangements are simply illustrative of the application of the principle of the invention and numerous other arrangements may be readily devised by those skilled in the art which will embody the principles of the invention and fall within the spirit and scope thereof. It is, therefore, intended that the matter contained in this description and the accompanying drawings be considered as illustrative and not as limiting.

What I claim is:

1. In an apparatus for automatically venting gases accumulated above a liquid responsive to the to open of the liquid which apparatus comprises a chamber adapted to hold liquid and gas, conduit means below the liquid level in said chamber connecting said liquid and gas to a source thereof, float means within said chamber disposed for reciprocating movement relative to the level of liqud in said chamber, vent means above the liquid level in said chamber adapted to vent gas therefrom close biased valve means operatively associated with said vent means responsive to the level of said float means adapted to close said vent means upon the rise of said liquid level and corresponding movement of said float means and adapted to open said vent means upon the lowering of said liquid level and corresponding movement of said float means, and a junction member attaching said float means to said valve means; the improvement which comprises said junction member comprising two prong means extending from said valve means, a bent first portion extending from said float means engaging a first of said prong means in the bend thereof whereby said bent portion depresses said first prong means upon lowering said liquid level and permitting said bias to close said valve upon rising of the liquid level, and a straight second portion extending from said float means slidably engaging a second of said prong means whereby said float means is substantially prevented from rotational motion relative to said valve means and to said chamber.

2. The improvement according to claim 1 including a valve body having a tubular edges seat member disposed for communication with the interior of the chamber and defining a venting passage through the valve body, a resilient closure member disposed in operative engagement with the tubular edged sheet member to effectively open and close the venting passage, and spring means operatively connected to the closure member operatively connected with the valve body for urging the closure member into a normal position of operative engagement with the seat member to close the vent passage.

3. T8e improvement according to claim 1 wherein said float means contains a multiple of projecting extensions for resting the float means at the bottom of said chamber in the absence of buoyant engagement of said float means with the liquid.

4. The improvement according to claim 3 including means for guiding comprising a rod extending from the bottom of the float member and slidably engaging the conduit means whereby restraining the float member from lateral movement during reciprocating movement caused by buoyant engagement with the liquid within the chamber entering the chamber through the conduit means from the liquid source.

5. The improved apparatus claimed in claim 1 wherein said second portion is longer than the distance from the top of said chamber to the bottom of said valve means whereby said second portion prevents said float from contacting said valve means upon the rising of said liquid.

Flair 210

UNITED STATES PATENT OFFICE
CERTIFICATE OF CORRECTION

Patent No. 3,586,032  Dated June 22, 1971

Inventor(s) RICHARD WEINSTEIN

It is certified that error appears in the above-identified patent and that said Letters Patent are hereby corrected as shown below:

Column 1, line 58, "snapin" should be -- snap-in --; column 2, line 9, after "are" insert --perspective--; line 66, after "surface" insert --level--; line 74, "biases" should be --biased--; column 3, line 44, after "guide" insert --bar--; column 4, line 64, cancel "to open" and substitute --level--; column 5, line 15, "edges" should be --edged--; column 6, line 1, after "member" insert --and--; line 7, cancel "the"; same column 6, line 4, "T8e" should read -- The --.

Signed and sealed this 4th day of January 1972.

(SEAL)
Attest:

EDWARD M. FLETCHER, JR.
Attesting Officer

ROBERT GOTTSCHALK
Acting Commissioner of Patents